US012802341B2

(12) United States Patent
Tsujibayashi

(10) Patent No.: US 12,802,341 B2
(45) Date of Patent: Nov. 17, 2026

(54) IMAGE GENERATION APPARATUS AND CONTROL METHOD FOR IMAGE GENERATION APPARATUS

(71) Applicant: CANON KABUSHIKI KAISHA, Tokyo (JP)

(72) Inventor: Masahiro Tsujibayashi, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 115 days.

(21) Appl. No.: 18/908,337

(22) Filed: Oct. 7, 2024

(65) Prior Publication Data

US 2025/0118012 A1 Apr. 10, 2025

(30) Foreign Application Priority Data

Oct. 10, 2023 (JP) ................................ 2023-175023

(51) Int. Cl.
*G06T 15/20* (2011.01)
*G06T 7/00* (2017.01)
(Continued)

(52) U.S. Cl.
CPC ............ *G06T 15/20* (2013.01); *G06T 7/0002* (2013.01); *G06T 7/50* (2017.01); *G06T 19/20* (2013.01); *G06T 2200/04* (2013.01); *G06T 2207/10016* (2013.01); *G06T 2207/20104* (2013.01); *G06T 2207/20212* (2013.01); *G06T 2207/30168* (2013.01); *G06T 2210/21* (2013.01); *G06T 2219/2004* (2013.01)

(58) Field of Classification Search
CPC ......... G06T 15/20; G06T 7/0002; G06T 7/50; G06T 19/20; G06T 2200/04; G06T 2207/10016; G06T 2207/20104; G06T 2207/20212; G06T 2207/30168; G06T 2210/21; G06T 2219/2004; G06T 7/521; G06T 7/70; G06T 2207/10012; G06T 2207/10021; G06T 2207/20056; G06T 2207/10024; G06T 2207/10028; G06T 2207/20084; G06T 2207/30201
See application file for complete search history.

(56) References Cited

U.S. PATENT DOCUMENTS

| | | | | |
|---|---|---|---|---|
| 10,520,739 | B1 * | 12/2019 | Vlachos | G02B 27/0189 |
| 2016/0169665 | A1 * | 6/2016 | Deschenes | G01B 11/002 356/606 |

(Continued)

FOREIGN PATENT DOCUMENTS

| | | | |
|---|---|---|---|
| JP | 2013165475 | A | 8/2013 |

*Primary Examiner* — Said Broome
*Assistant Examiner* — Andrew Shin
(74) *Attorney, Agent, or Firm* — Canon U.S.A., Inc. IP Division

(57) ABSTRACT

An image generation apparatus includes one or more memories storing instructions; and one or more processors that, upon execution of the stored instructions, are configured to operate as a first acquisition unit configured to acquire 3D data and a defective area of the 3D data, a second acquisition unit configured to acquire a movable range of a virtual camera, and a generation unit configured to generate mask data based on the movable range of the virtual camera and the defective area such that the defective area is not visible in the movable range of the virtual camera.

8 Claims, 22 Drawing Sheets

(51) Int. Cl.
*G06T 7/50* (2017.01)
*G06T 19/20* (2011.01)

(56) References Cited

U.S. PATENT DOCUMENTS

| | | | | |
|---|---|---|---|---|
| 2018/0047208 | A1* | 2/2018 | Marin | G06T 15/506 |
| 2021/0142581 | A1* | 5/2021 | Molyneaux | G06T 19/00 |
| 2021/0375033 | A1* | 12/2021 | Khaloo | G06T 17/20 |
| 2024/0370979 | A1* | 11/2024 | Lopez Fernandez | G06T 19/20 |

* cited by examiner

IMAGE GENERATION APPARATUS AND CONTROL METHOD FOR IMAGE GENERATION APPARATUS

BACKGROUND

Field

The present disclosure relates to an image generation method and an image generation apparatus, and more particularly to a three-dimensional image generation apparatus and a three-dimensional image generation method.

Description of the Related Art

There are conventionally known techniques for acquiring distance distribution information, such as stereo cameras and light field cameras. The distance distribution information can be subjected to perspective projection transformation to obtain a point cloud. Furthermore, converting the point cloud into polygons makes it possible to generate a three-dimensional surface model having surfaces.

Acquiring an image (color distribution information) simultaneously with the distance distribution information makes it possible to generate three-dimensional (3D) data including texture information. Unlike an ordinary two-dimensional image, 3D data is advantageous in that it allows a user to enjoy an image from any viewpoint.

For example, Japanese Patent Application Laid-Open No. 2013-165475 discusses a method for generating a virtual viewpoint image in which the position of a virtual viewpoint and the focusing position is changed based on depth information calculated on the principle of a light field camera.

SUMMARY

According to an aspect of the present disclosure, an image generation apparatus includes one or more memories storing instructions; and one or more processors that, upon execution of the stored instructions, are configured to operate as a first acquisition unit configured to acquire 3D data and a defective area of the 3D data, a second acquisition unit configured to acquire a movable range of a virtual camera, and a generation unit configured to generate mask data based on the movable range of the virtual camera and the defective area such that the defective area is not visible in the movable range of the virtual camera.

According to another aspect of the present disclosure, a control method for an image generation apparatus includes acquiring 3D data and a defective area of the 3D data, acquiring a movable range of a virtual camera, and generating mask data based on the movable range of the virtual camera and the defective area such that the defective area is not visible in the movable range of the virtual camera.

Further features of the present disclosure will become apparent from the following description of exemplary embodiments with reference to the attached drawings.

DESCRIPTION OF THE EMBODIMENTS

Figure 1:
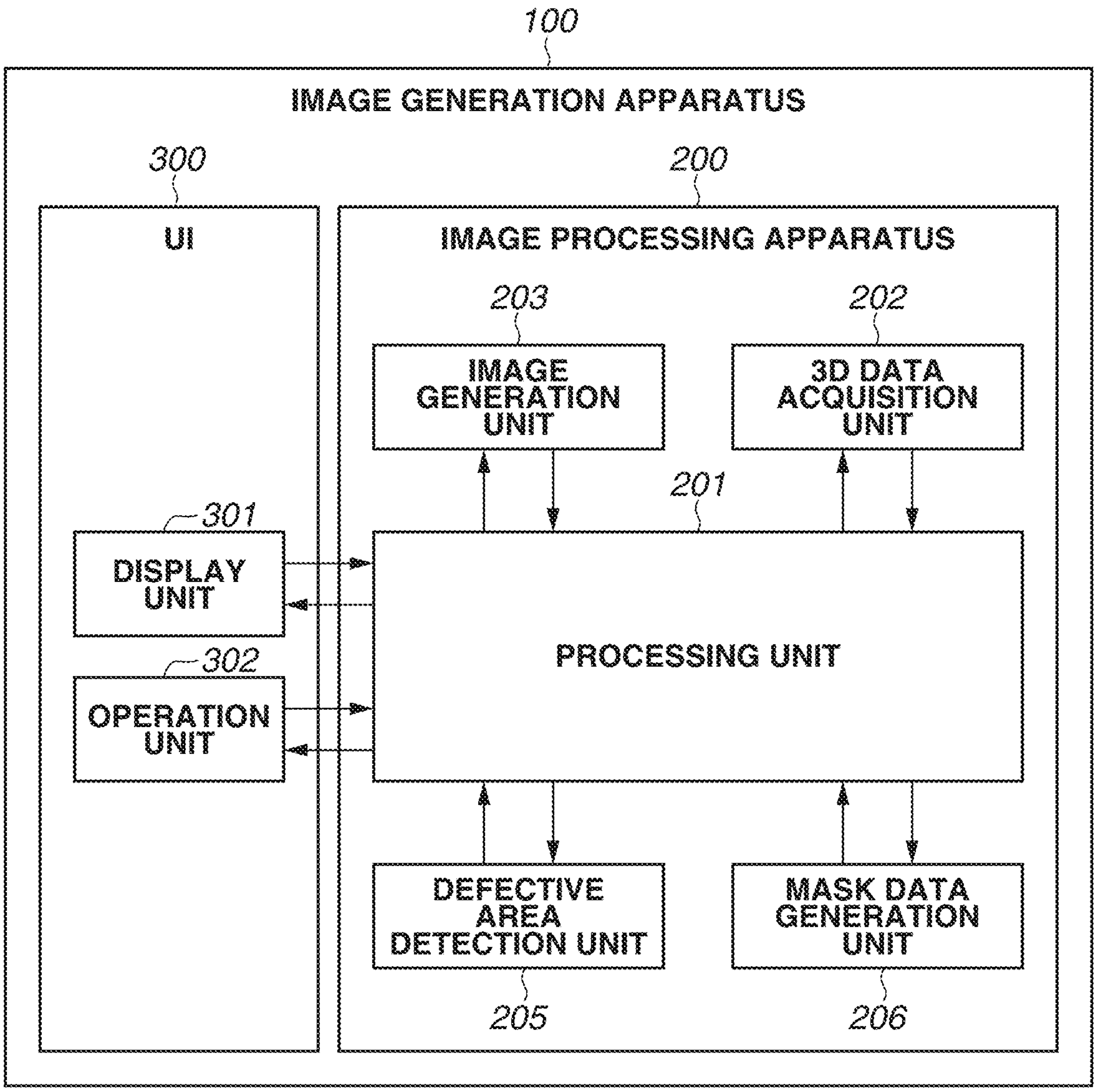
FIG. 1 is a block diagram illustrating a hardware configuration of an image generation apparatus according to an exemplary embodiment of the present disclosure.

Exemplary embodiments of the present disclosure will be described below in detail with reference to the accompanying drawings. FIG. 1 illustrates an image processing apparatus according to a first exemplary embodiment of the present disclosure.

In three-dimensional (3D) data that is created using a stereo camera, a light field camera, or the like, a subject may not fit entirely in the field of view but may be partially cut off. If the subject is cut off in this way, the 3D data thereof is partially defective. When the 3D data is combined with a 3D background to enhance a sense of immersion, the subject may appear to be floating in the air, for example, causing a feeling of strangeness.

In view of this, the present disclosure is directed to providing an image generation apparatus that can reduce the feeling of strangeness in the case of 3D data in which data of a subject is partially missing.

<Configuration>

Hereinafter, an image processing apparatus that generates a virtual viewpoint image according to a first exemplary embodiment of the present disclosure will be described with reference to FIG. 1. An image generation apparatus 100 illustrated in FIG. 1 generates and outputs an image from a virtual camera viewpoint (hereinafter, referred to as a camera viewpoint) designated by a user or the like based on input 3D image data. The image generation apparatus 100 according to the present exemplary embodiment includes an image processing apparatus 200 and a d. A dedicated application for performing various operations, such as displaying a camera viewpoint image on the image processing apparatus 200 and issuing an instruction to change a viewpoint to the image processing apparatus 200, is installed in the user interface 300. The image processing apparatus 200 generates the camera viewpoint image based on 3D data and displays the camera viewpoint image on the user interface 300. In addition, upon receipt of a camera viewpoint change instruction from the dedicated application of the user interface 300, the image processing apparatus 200 generates an image based on a changed camera viewpoint position and provides the image to the user interface 300.

The image processing apparatus 200 is a server computer, for example, and includes a processing unit 201, a 3D data acquisition unit 202, an image generation unit 203, a defective area detection unit 205, and a mask data generation unit 206. The user interface 300 is a personal computer, for example, that is electrically connected to the image processing apparatus 200, and includes a display unit 301 and an operation unit 302.

The processing unit 201 included in the image processing apparatus 200 controls the entire image processing apparatus 200 using programs and data stored in advance, thereby implementing the functional units illustrated in FIG. 1. The processing unit 201 may include one or more pieces of dedicated hardware that are different from the processing unit 201, and at least part of processing to be performed by the processing unit 201 may be executed by the dedicated hardware. Examples of the dedicated hardware include an application specific integrated circuit (ASIC), a field programmable gate array (FPGA), and a digital signal processor (DSP). The 3D data acquisition unit 202, the image generation unit 203, the defective area detection unit 205, and the mask data generation unit 206 are stored as programs in a read only memory (ROM) (not illustrated), and serve their functions by the programs being executed by the processing unit 201. A random access memory (RAM) (not illustrated) temporarily stores data provided from the processing unit 201, data provided from the outside via a communication interface (I/F) (not illustrated), and the like.

The display unit 301 provided in the user interface 300 includes a liquid crystal display, for example, and displays a graphical user interface (GUI) or the like for the user to operate the image processing apparatus 200. The operation unit 302 includes a keyboard, a mouse, a joystick, and/or the like, for example, and upon receipt of operations by the user, inputs various instructions to the display unit 301. A configuration in which the operation unit 302 is integrated with the display unit 301, such as a liquid crystal display equipped with a touch panel, may also be employed.

<About Generation of 3D Data>

Figure 2:
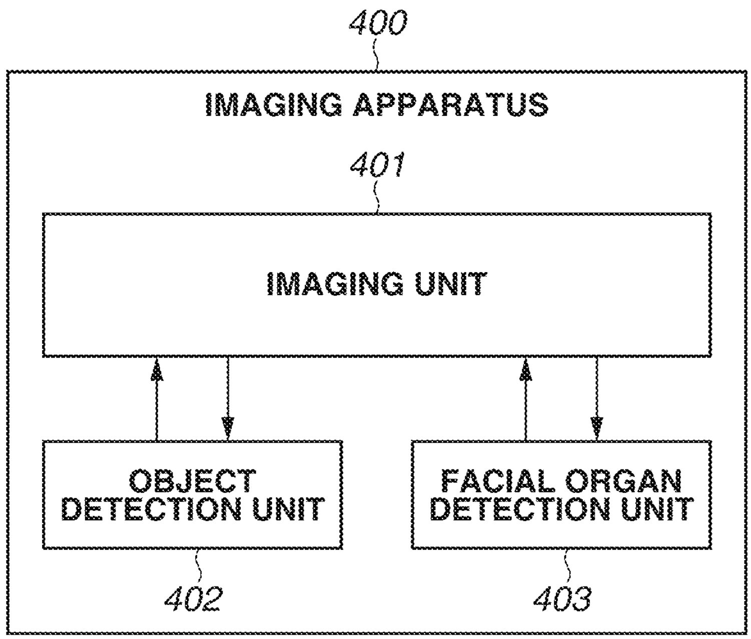
FIG. 2 is a block diagram illustrating a hardware configuration of an imaging apparatus according to the exemplary embodiment of the present disclosure.

Next, an example of a generation method of 3D data according to the present exemplary embodiment will be described based on a configuration diagram of an imaging apparatus 400 illustrated in FIG. 2. The imaging apparatus 400 includes an imaging unit 401 that can capture 3D data, and the captured 3D data can be saved in a recording medium. The imaging unit 401 can have any configuration as long as it functions as an acquisition unit that can acquire 3D data. More desirably, the imaging unit 401 is capable of simultaneously acquiring distance distribution information and color distribution information from the same viewpoint as that of the distance distribution information. Examples of the configuration that implements such functions include a stereo camera that is equipped with two imaging systems of an optical system and an imaging element capable of acquiring red, green, and blue (RGB) images, a time-of-flight (ToF) camera that is equipped with a ToF module capable of acquiring distance distribution information and an imaging system capable of acquiring RGB images. Hereinafter, as an example, a configuration of the imaging unit 401 that can simultaneously acquire the distance distribution information and the color distribution information by an image-sensing plane phase difference distance measurement method will be described.

Figure 3:
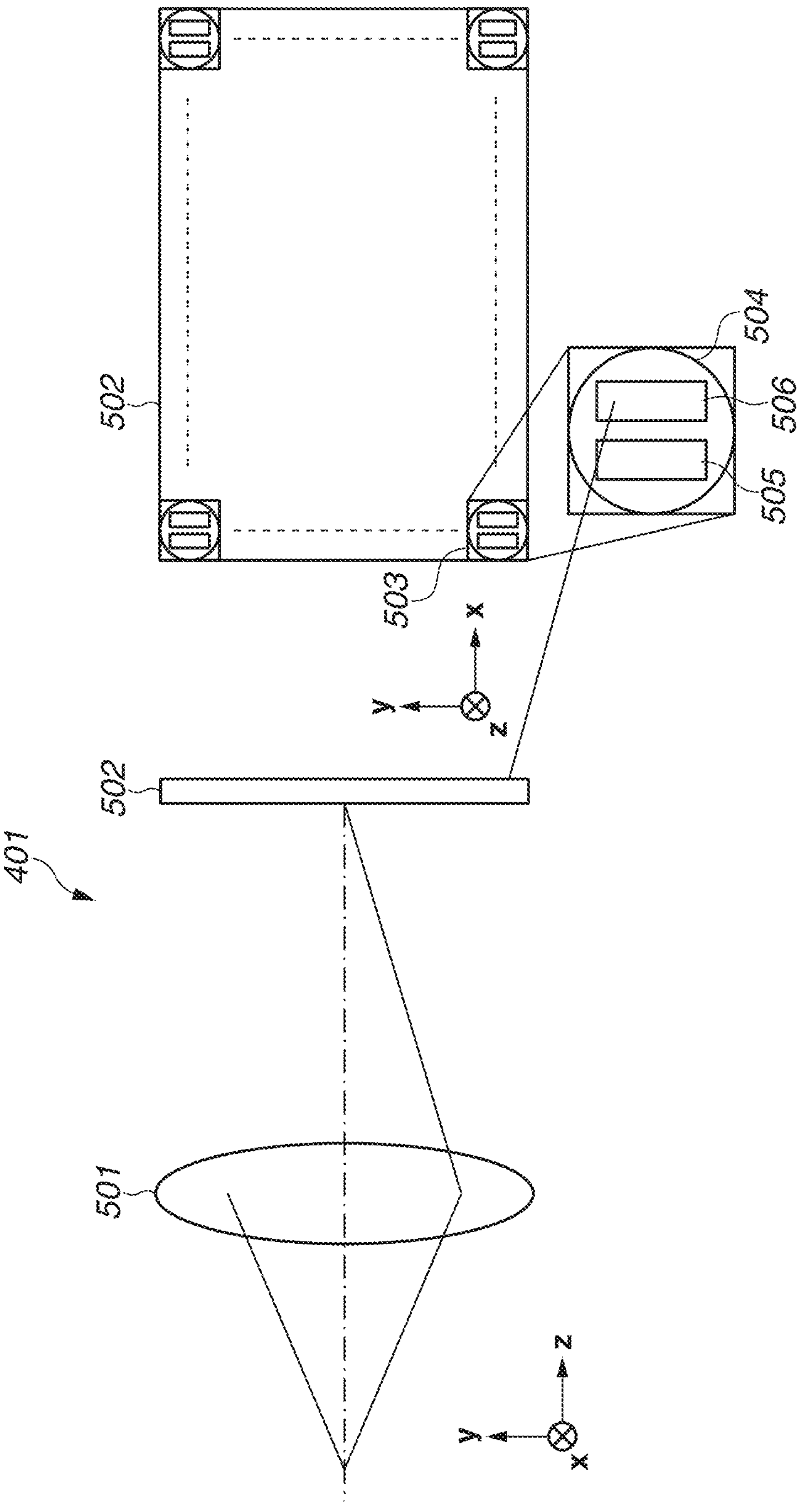
FIG. 3 is a diagram for describing an imaging unit according to the exemplary embodiment of the present disclosure.

FIG. 3 illustrates a configuration of the imaging unit 401. The imaging unit 401 includes an imaging optical system 501 and an imaging element 502. The imaging unit 401 captures an image by collecting light from a subject located on an object plane using the imaging optical system 501 and then exposing the imaging element 502 that is located at a position approximately optically conjugate with the object plane.

The imaging element 502 has a structure in which tens of millions of pixels 503 that are photoelectric conversion elements are arranged in a lattice pattern, for example. The pixels are provided with color filters that transmit light of specific wavelengths such as red, green, and blue, and are arranged in a Bayer array, for example, whereby the color distribution information can be acquired.

One pixel 503 includes a microlens 504, a first photoelectric conversion unit 505, and a second photoelectric conversion unit 506, and obtains different pieces of light information by the two photoelectric conversion units 505 and 506 arranged in a horizontal direction (X direction) based on their positions. From the received light information on all the pixels, a first image that is configured as luminance distribution of light received by the first photoelectric conversion unit 505 and a second image that is configured as luminance distribution of light received by the second photoelectric conversion unit 506 are obtained.

An incident surface of the imaging element 502 and light receiving surfaces of the first photoelectric conversion unit 505 and second photoelectric conversion unit 506 are in a substantially Fourier conjugate relationship due to the microlens 504. Thus, the light receiving surfaces of the photoelectric conversion units and an exit pupil of the imaging optical system 501 are in a substantially optically conjugate relationship. Since the position distribution of the exit pupil and the position distribution of the light receiving surfaces of the photoelectric conversion units correspond to each other, providing the two different photoelectric conversion units makes it possible to separately receive light rays that have passed through different pupil regions.

The first image and the second image indicate pieces of luminance distribution information that are obtained by the light rays having passed through the different pupil regions.

A light ray that forms an image on imaging surface (ideally) enters the same point on the imaging element 502 regardless of a position on the pupil through which the light ray passes. However, for a defocused light ray, the position at which the light ray enters the imaging element 502 varies depending on the position on the pupil through which the light ray passes. In other words, an image shift occurs according to an amount of defocus.

An amount of the image shift can be calculated by stereo matching between the first image and the second image, for example. With respect to a patch of a small area in one image, matching is performed relative to the other image in a direction of an epipolar line, and an amount of the image shift is determined by identifying a position with the highest correlation. By using the amount of the image shift calculated in this manner and a focal length and a focus position obtained from imaging information, a position is converted into a world coordinate system to generate 3D data.

In addition, the data captured by the imaging unit 401 is grouped by object (type of subject) by an object detection unit 402. At this time, if the object is a person, a facial organ detection unit 403 detects facial feature points and calculates coordinates of facial organs. These pieces of information are linked to the 3D data and stored in a recording medium.

<About 3D Data>

Figure 4A:
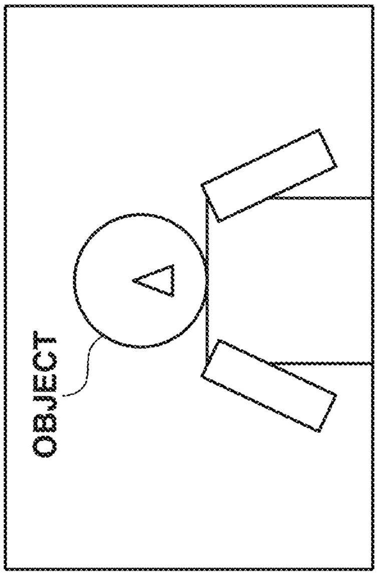
FIGS. 4A, 4B, 4C, and 4D are diagrams each illustrating 3D data and a virtual camera viewpoint according to the exemplary embodiment of the present disclosure.

Next, the 3D data according to the present exemplary embodiment will be described. FIG. 4A illustrates a two-dimensional image captured by the above-described imaging apparatus 400, FIG. 4B is a diagram illustrating a positional relationship between the generated 3D data on an object and a virtual camera A and a virtual camera B, and FIG. 4C is a diagram illustrating a two-dimensional image that is an image generated from a viewpoint of the virtual camera A.

Now, coordinate axes will be described. As illustrated in FIG. 4B, the coordinate axes in virtual space are set such that the optical axis of the virtual camera located at the same position as the imaging camera is the z axis. In addition, as illustrated in FIG. 4C, a direction of gravity of imaging data is set as the y axis, and an axis perpendicular to the y and z axes is set as the x axis.

Figure 4B:
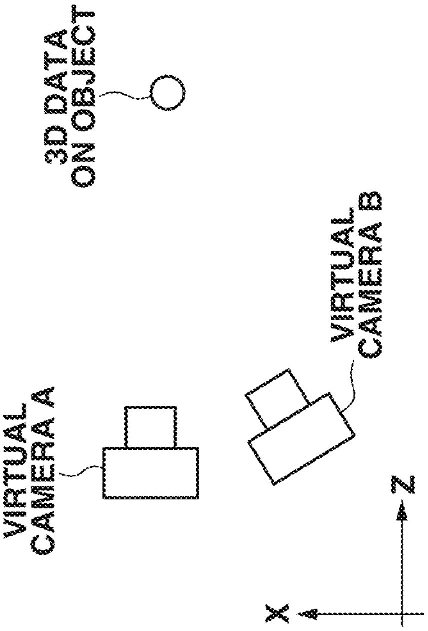
Figure 4C:
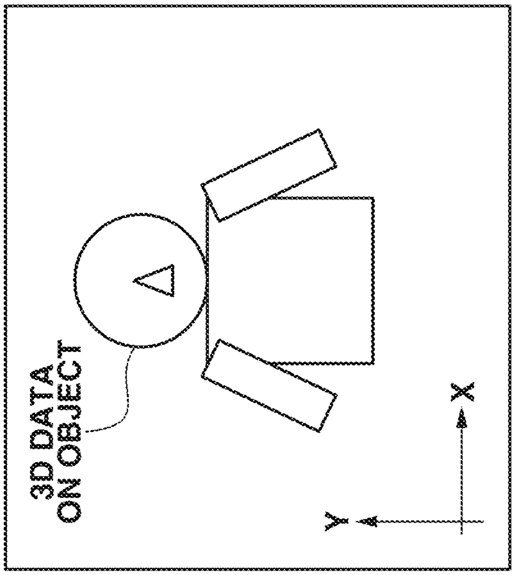
Figure 4D:
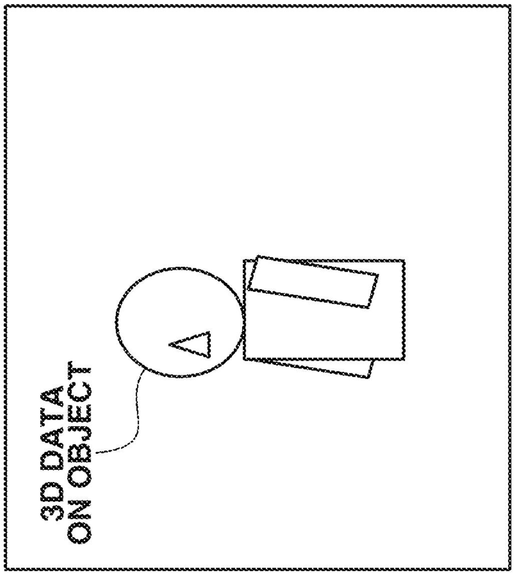

FIG. 4D illustrates a two-dimensional image that is an image generated from a viewpoint of the virtual camera B illustrated in FIG. 4B. In this manner, the 3D data on the object can be enjoyed from any viewpoint by converting the image based on the viewpoint of the virtual camera.

The captured image only includes the upper body of the subject, with the lower body and below being cut off. In this case, similarly, the 3D data on the object is generated only for the upper body, with the lower body and below being defective.

The 3D data on the object according to the present exemplary embodiment is not limited to the subject imaged by the imaging apparatus as illustrated in FIGS. 4A to 4D, but may be 3D data obtained by combining object data on the subject with separately prepared 3D background data. The subject is not limited to a person, but may be a non-living matter or a living matter.

<Description of Overall Processing Flow>

Figure 5:
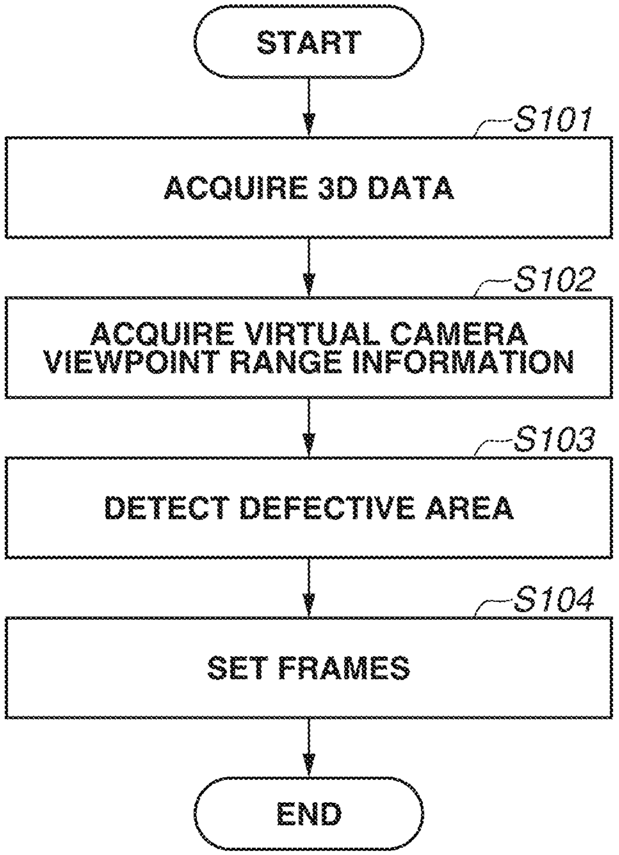
FIG. 5 is a flowchart illustrating generation processing executed by the image generation apparatus according to a first exemplary embodiment.

Next, a flow of processing of generating mask data from 3D data executed by the image generation apparatus 100 according to the present exemplary embodiment will be described with reference to the flowchart in FIG. 5. The processing in the flowchart in FIG. 5 is implemented by the processing unit 201 receiving an instruction for viewpoint change processing from the user interface 300 and executing a predetermined processing program. For example, after the user performs an operation, such as inputting 3D data on which the viewpoint change processing is to be performed, on the above-described dedicated application, the user is allowed to select whether to perform the processing. When the user issues a command based on his/her selection, the processing is started.

In step S101, 3D data is acquired. In the acquired 3D data, a single object is recognized and is cut out. The 3D data includes face recognition information so that it can be determined whether the object is a person.

In step S102, the processing unit 201 acquires information on a movable range of the virtual camera. The information on the movable range of the virtual camera is set in advance in the application, and indicates the range in which the virtual camera can move. This setting can be changed by performing an operation on the user interface 300.

In step S103, the processing unit 201 executes the defective area detection unit 205 to detect a defective area of the object in the 3D data. First, the defective area detection unit 205 performs labeling using deep learning on the image data of the object to estimate the overall shape of the object. Then, the defective area detection unit 205 compares the estimated shape with the 3D data to calculate a boundary surface where the object in the 3D data is defective, thereby determining a defective area.

When the defective area is detected, in step S104, the processing proceeds to mask data generation processing. In the mask data generation processing, the processing unit 201 generates mask data so that the defective area is not visible from the viewpoint of the virtual camera.

When the above-described steps are completed, the processing ends.

The above is an outline of the mask data generation processing in the image processing apparatus 200.

<About Movable Range of Virtual Camera>

Figure 6A:
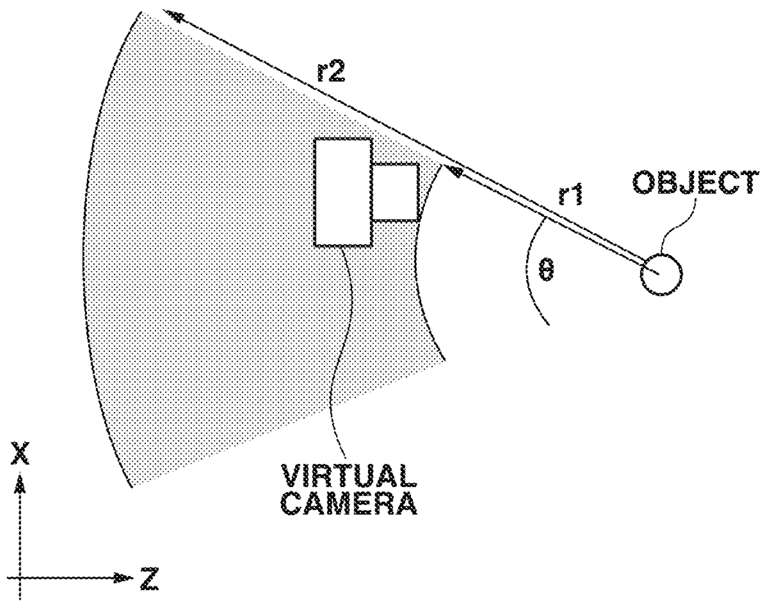
FIGS. 6A and 6B are diagrams illustrating the positional relationship between 3D data and a virtual camera in the first exemplary embodiment.
Figure 6B:
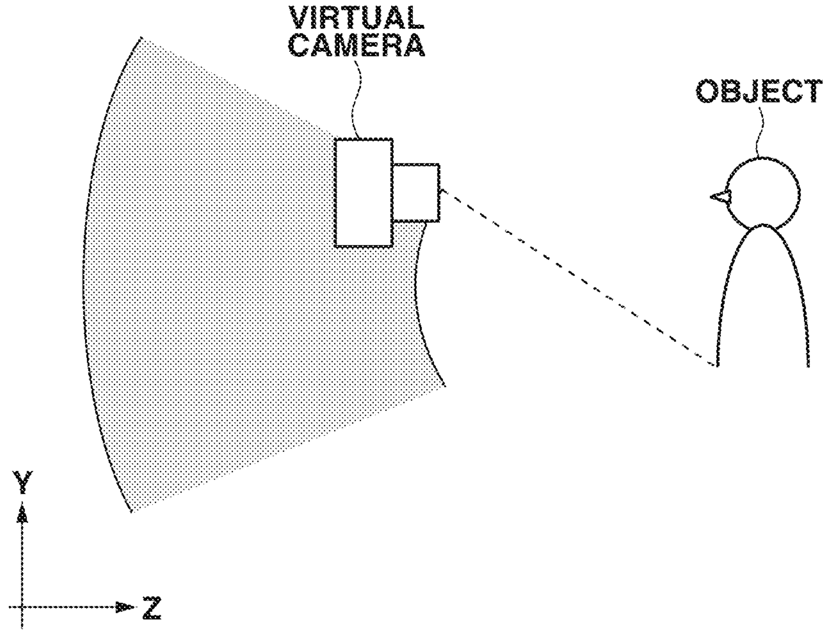

Next, the movable range of the virtual camera in virtual space will be described. FIGS. 6A and 6B are diagrams of an example illustrating the movable range of the virtual camera according to the present exemplary embodiment. FIG. 6A is a top view of the virtual camera and 3D data in the virtual space, and FIG. 6B is a side view of the same virtual camera and 3D data. As illustrated in FIG. 6A, the movable range of the virtual camera in an xz plane is determined by a shortest distance r1 and a longest distance r2 between the object and the camera, and a rotation angle θ, centered on the center of gravity of the object in the 3D data. In the present exemplary embodiment, r1=1 m, r2=3 m, and θ=60°. In addition, as illustrated in FIG. 6B, the movable range of the virtual camera in an yz plane is set in the same manner.

In the present exemplary embodiment, a z direction is set to an optical axis direction of the imaging camera, but the z direction may be set to a forward direction of the virtual camera in world coordinates in a 3D space. The z direction is defined as the vertical direction in the world coordinates, and a y direction is defined as the horizontal direction in the world coordinates that is perpendicular to the z direction.

Since the position of the virtual camera can be restricted by installing the virtual camera in a specific spatial area and generating the virtual viewpoint image data as described above, it is possible to reduce the feeling of strangeness about the image that is viewed from a virtual viewpoint. The user may be allowed to freely set the movable range of the virtual camera based on the object.

<About Defective Area>

Figure 7:
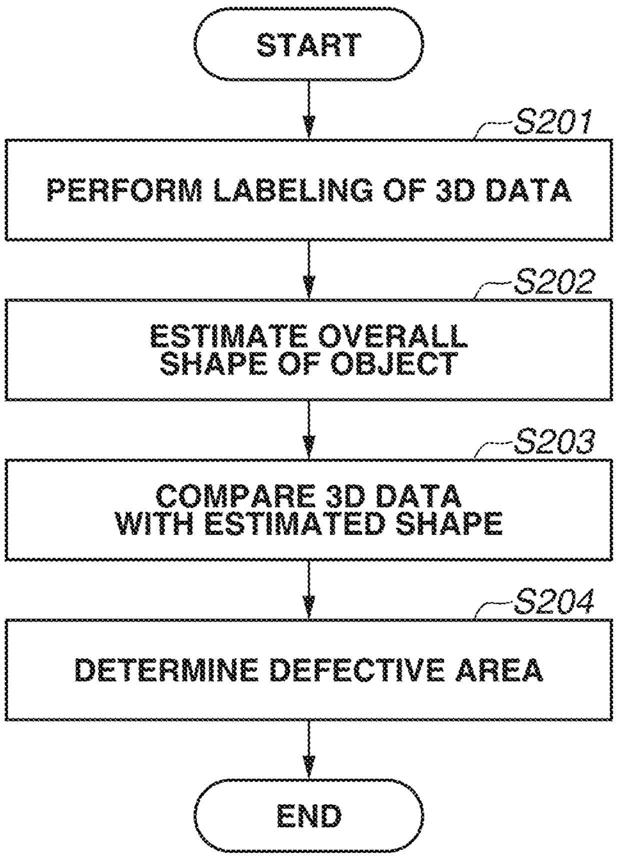
FIG. 7 is a flowchart illustrating a method for obtaining a defective area according to the first exemplary embodiment.

Next, a method for obtaining a defective area of an object in 3D data will be described with reference to the flowchart in FIG. 7.

First, in step S201, the processing unit 201 performs labeling of the input 3D data for each object. For example, labeling is performed using deep learning such that semantically categorized labels are attached. Alternatively, the user may specify an object and input a label. In the present exemplary embodiment, when an image as illustrated in FIG. 4A is input, the label "person" is attached to the image.

Figure 8A:
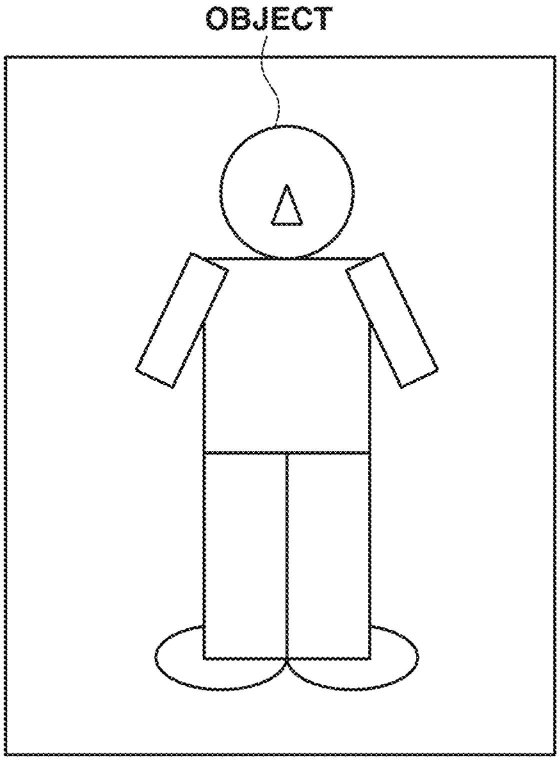
FIGS. 8A and 8B are diagrams illustrating model data and a defective area in 3D data according to the first exemplary embodiment.

In step S202, the processing unit 201 estimates the overall shape of a target object based on the label. For example, based on a model shape of a representative model prepared in advance, the processing unit 201 corrects the posture and shape in the image data of the target object using deep learning, and estimates the overall shape of the object. In the present exemplary embodiment, the overall shape is estimated as illustrated in FIG. 8A.

Figure 8B:
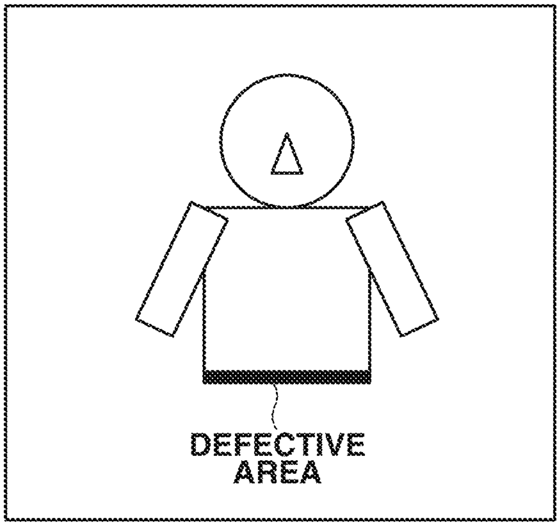

Then, in step S203, the processing unit 201 compares the target object in the 3D data with the overall shape estimated as above. In step S204, the processing unit 201 calculates a defective part of the object, and determines the boundary between the defective part and the object as the defective area. In the present exemplary embodiment, a thick-line portion illustrated in FIG. 8B is determined as the defective area.

In this manner, in the present exemplary embodiment, object detection and shape estimation are performed using deep learning to determine the defective area. Alternatively, the user may directly input and specify the defective area via the operation unit 302. In this case, the user interface 300 is provided with a function of accepting input of the defective area, and the defective area is determined by a user operation.

<About Method for Generating Mask Data>

Figure 9:
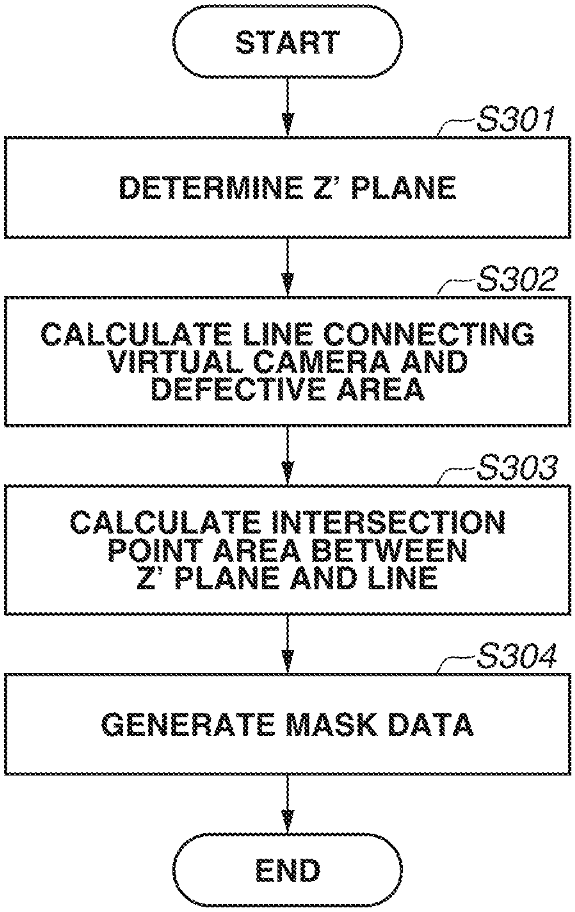
FIG. 9 is a flowchart illustrating a mask data generation method according to the first exemplary embodiment.

Next, a method for generating mask data will be described with reference to the flowchart in FIG. 9.

First, in step S301, the processing unit 201 acquires z coordinate value distribution of the target object from the 3D data, and calculates a position z' that is a position a predetermined value away from a minimum value of the acquired z coordinate value distribution. A Z' plane, which is a mask data generation plane, is determined to be at a position where z=z'. In the present exemplary embodiment, the predetermined value is set to 50 mm in calculating the position z'.

Next, in step S302, the processing unit 201 draws lines connecting coordinates in the movable range of the virtual camera obtained as described above with coordinates in the defective area. In step S303, the processing unit 201 calculates an intersection point area P where these lines intersect with the Z' plane.

Figure 10:
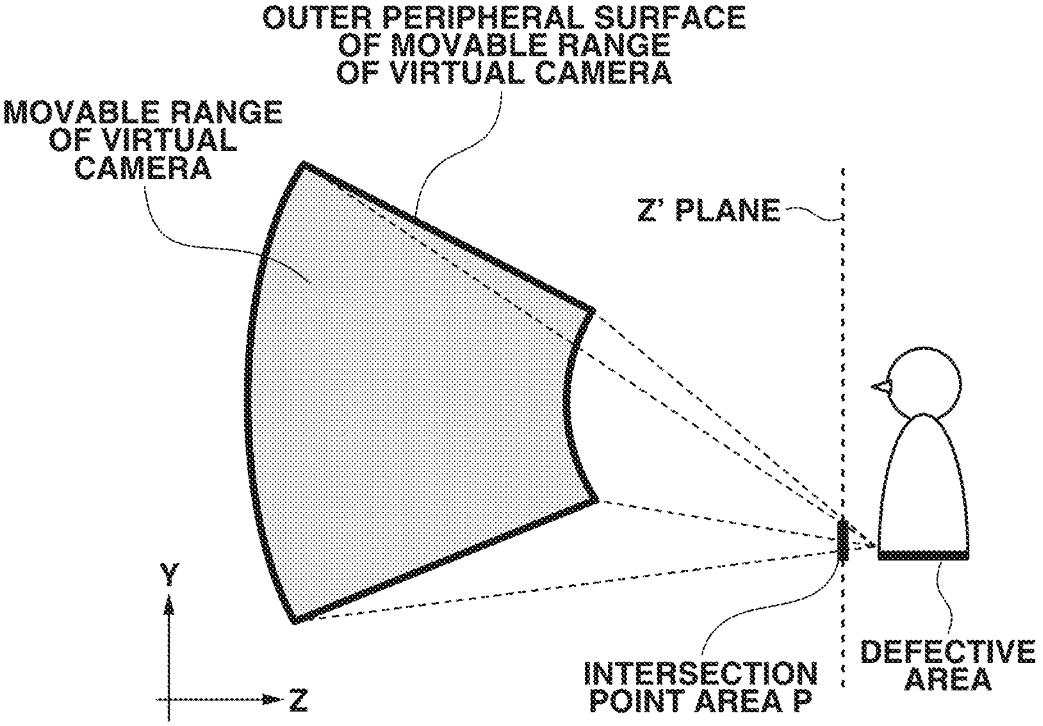
FIG. 10 is a diagram illustrating an intersection point area according to the first exemplary embodiment.

FIG. 10 is a diagram illustrating a relationship, on the yz plane, among the movable range of the virtual camera, the object in the 3D data, and the intersection point area P according to the present exemplary embodiment. As in the drawing, the intersection point area P is determined from the lines connecting the movable range of the virtual camera and the defective area, and the Z' plane.

Then, in step S304, the processing unit 201 generates mask data M so as to be superimposed on the intersection point area P, and the processing ends.

<Effect>

Figure 11A:
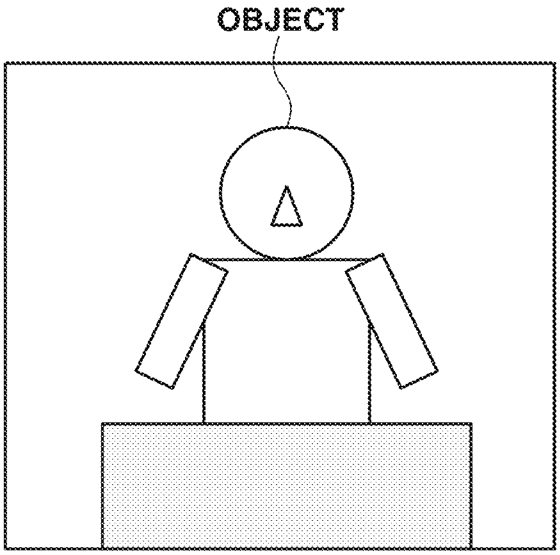
FIGS. 11A and 11B are diagrams for describing an effect according to the first exemplary embodiment.
Figure 11B:
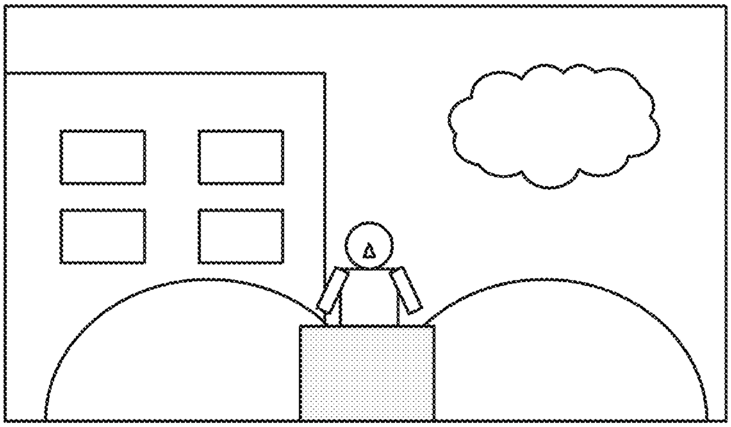

FIG. 11A illustrates 3D data resulting from the generation of the mask data M for the scene illustrated in FIGS. 4A to 4D, and FIG. 11B illustrates 3D data obtained by further combining the 3D data in FIG. 11A with a background image. As described above, even if a user combines 3D data having a defective area with other 3D data, the image generation apparatus 100 according to the present disclosure generates mask data M on the defective area, so that it is possible to generate 3D data that does not cause the feeling of strangeness due to the presence of the defective area.

In the above-described exemplary embodiment, the intersection point area P on which the mask data M is superimposed is determined by calculating intersection points for all the coordinates in the movable range of the virtual camera. Alternatively, in order to speed up the processing, the number of search coordinates for the movable range may be decreased. For example, a similar effect can be obtained by setting an outer peripheral surface of the movable range as a search range and determining the intersection point area P.

If the mask data M is sufficiently large relative to the defective area, the search range can be further reduced. For example, if the mask data M is sufficiently large relative to the defective area in the −y direction and ±x direction, the search range can be limited as described below.

Figure 12:
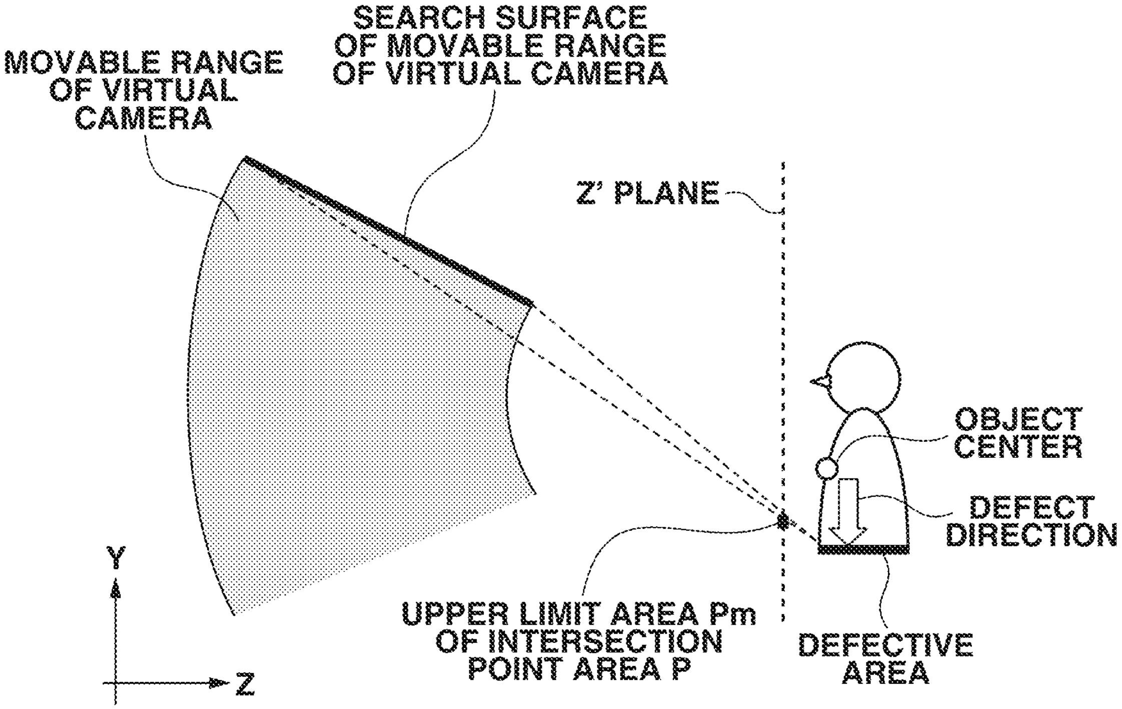
FIG. 12 is a diagram illustrating a search range reduction technique in the mask data generation method according to the first exemplary embodiment.

Specifically, first, when a direction in which the defective area exists with respect to an object center is defined as a defective direction, one surface of the outer peripheral surface in the opposite direction to the defective direction is set as a search surface in the movable range of the virtual camera, as illustrated in FIG. 12. Next, a line is created between the set search surface and the defective area, and an intersection point with the Z' plane set as described above is calculated to obtain an upper limit area Pm. This area is the maximum in the y-axis direction in the movable range of the virtual camera, and thus the mask data M of the above-described size is generated so as to be superimposed on the obtained upper limit area Pm, so that the defective area can be appropriately hidden from other virtual camera positions.

If the search surface in the movable range of the virtual camera is flat, the search range can be further reduced.

Figure 13A:
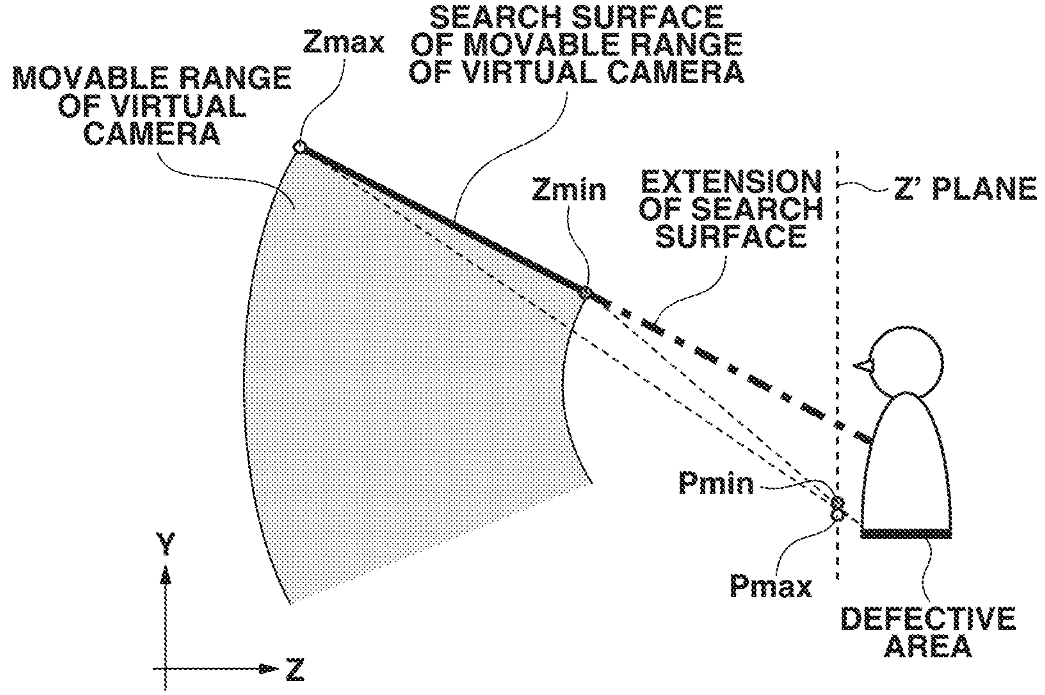
FIGS. 13A and 13B are diagrams illustrating a search range reduction technique in the mask data generation method according to the first exemplary embodiment.

Specifically, as illustrated in FIG. 13A, a case will be discussed in which coordinates where an extension of the search surface intersects with the object in the y-axis direction are greater than coordinates of the defective area. In this case, comparing an intersection point Pmin of a point Zmin closer to the object on the search surface and the Z' plane and an intersection point Pmax of a point Zmax farther from the object on the search surface and the Z' plane, the intersection point Pmin is located on the outside. Therefore, the similar results can be obtained even if the search range is limited to the point Zmin.

Figure 13B:
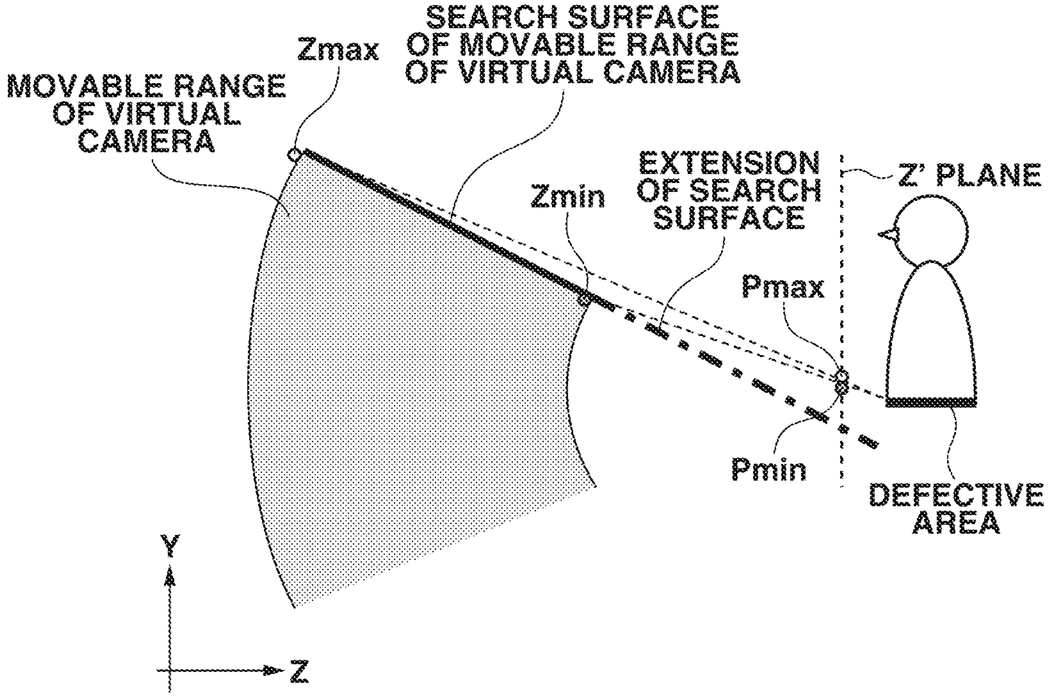

Conversely, as illustrated in FIG. 13B, if the coordinates where the extension of the search surface and the object intersect in the y-axis direction are smaller than the coordinates of the defective area, the intersection point Pmax is located on the outside. Therefore, the similar results can be obtained even if the search range is limited to the point Zmax.

(First Modification Example)

Figure 14:
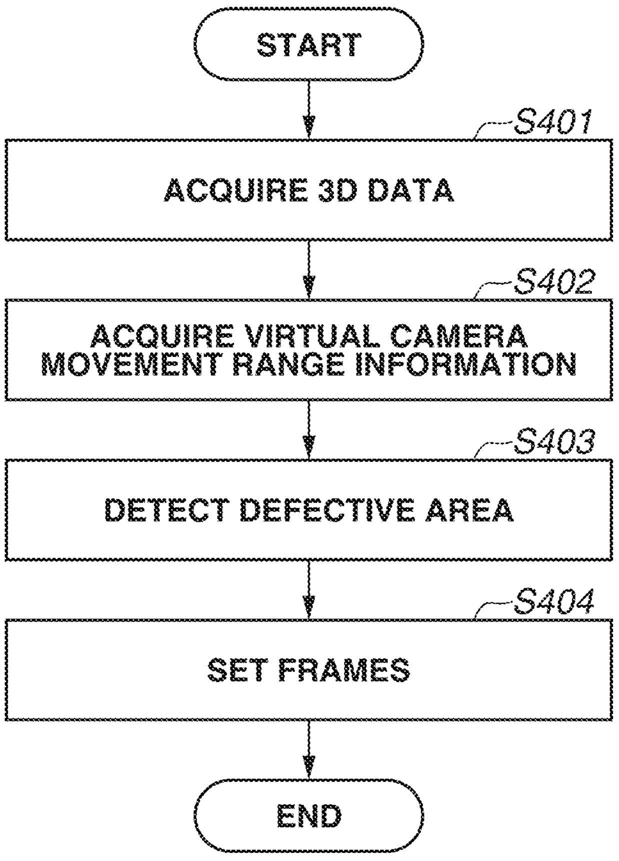
FIG. 14 is a flowchart illustrating generation processing executed by an image generation apparatus according to a modification example.

Although the 3D data used in the above-described exemplary embodiment is a still image, the effects of the present disclosure can be obtained similarly in a case where the 3D data is a moving image. In this case, it is not desirable that the mask data M moves between frames. Thus, in the present exemplary embodiment, a method for generating one piece of mask data M that can support all frames will be described. As a first modification example of the first exemplary embodiment, processing in the case where the 3D data is a moving image will be described with reference to the flowchart in FIG. 14.

In the present exemplary embodiment, the 3D data is handled as 3D moving image data in which a plurality of consecutive pieces of still image 3D data is collected. In step S401, upon acquisition of the 3D data, the processing unit 201 breaks down the 3D data into frames and processes them. The movable range of the virtual camera is the same as that in the first exemplary embodiment, so description thereof will be omitted.

Figure 15:
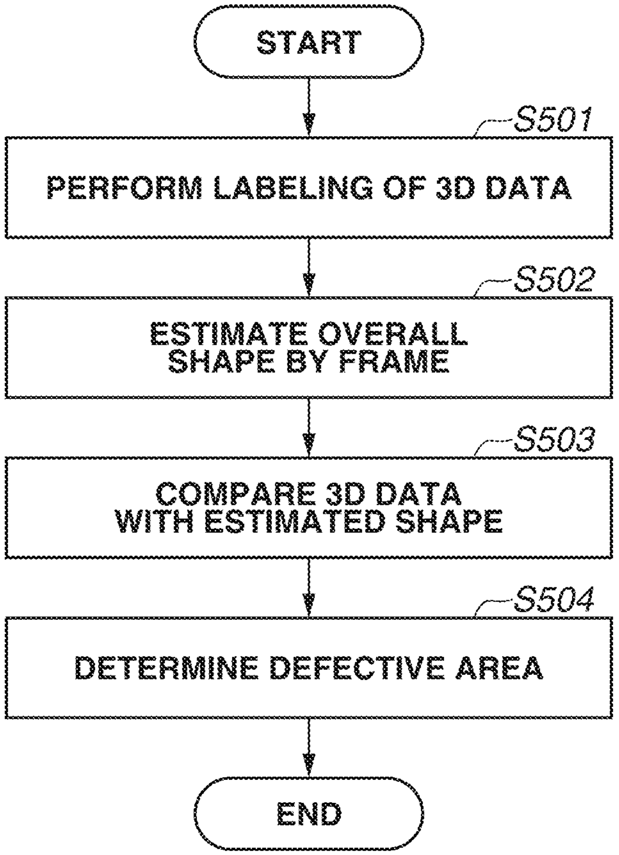
FIG. 15 is a flowchart illustrating a method for obtaining a defective area according to the modification example.

Next, the difference in the detection of a defective area from the first exemplary embodiment will be described with reference to the flowchart of FIG. 15.

First, in step S501, any one frame of the 3D data is labeled because it is sufficient to make it clear what the target object is. Next, in step S502, the processing unit 201 estimates the overall shape of the target object with respect to all the frames based on the label. The method of shape estimation is the same as that in the first exemplary embodiment, so description thereof will be omitted.

Subsequently, in step S503, the 3D data of each frame is compared with the estimated overall shape. In step S504, the boundary surfaces of defective parts are calculated in all the frames, and these surfaces are all integrated to obtain an outer peripheral surface of the entire defective part, which is determined as the defective area.

Figure 16:
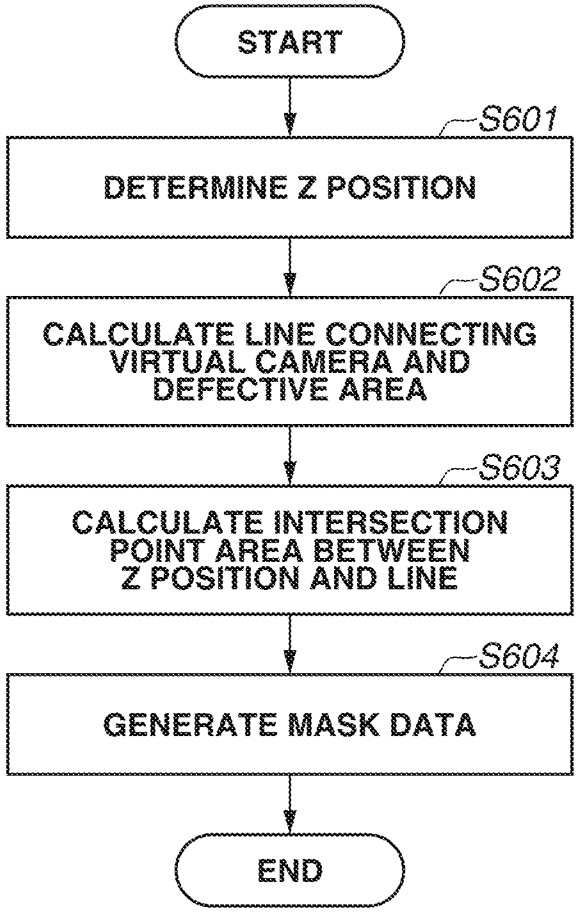
FIG. 16 is a flowchart illustrating a mask data generation method according to the modification example.

Similarly, mask data is generated by taking all the frames into consideration. The differences from the first exemplary embodiment will be described with reference to the flowchart in FIG. 16.

In step S601, in order to determine a Z' plane, z position distribution in all the frames is calculated, and the Z' plane is set at a position a predetermined distance away from a minimum value of the z position distribution. Then, similar processing as that in the first exemplary embodiment is performed to generate mask data M.

Generating the mask data M for the defective area in all the frames in this manner makes it possible to mask the defective area while keeping the mask data M stationary in the moving image.

In the first exemplary embodiment, as an example, the processing of acquiring information about the virtual camera viewpoint and information about the defective area from any piece of 3D data with a defective area and generating a mask in a space between the virtual camera viewpoint and the defective area is described. In a second exemplary embodiment, combining 3D data with a defective object and 3D data with only a defect-free object will be discussed. Specifically, an example of a method of arranging an object with a defective area in the combining will be described. The same reference numerals as those of the first exemplary embodiment are given to components identical to those of the first exemplary embodiment, and description thereof will be omitted.

Figure 17:
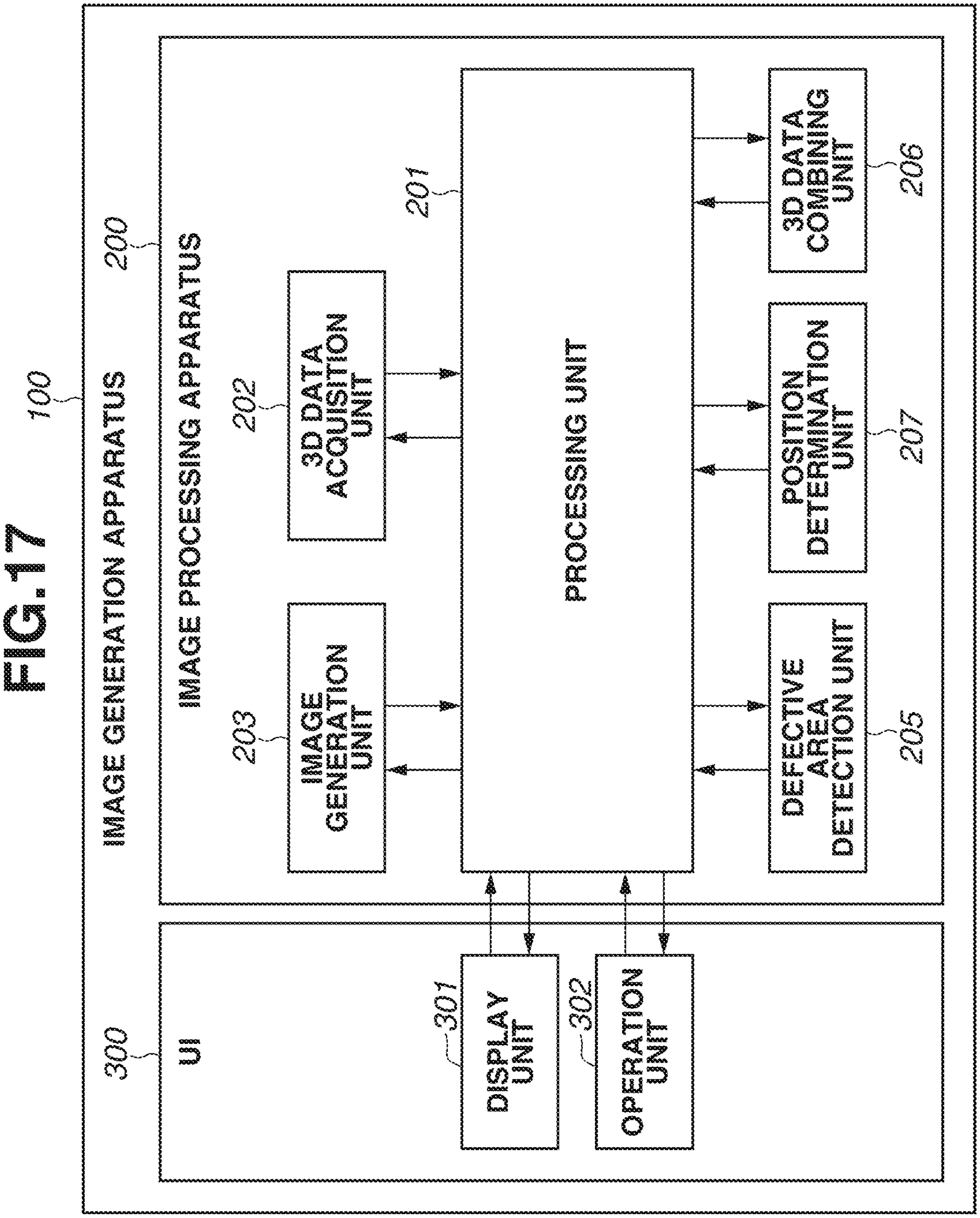
FIG. 17 is a block diagram illustrating a hardware configuration of an image generation apparatus according to a second exemplary embodiment.

FIG. 17 is a block diagram illustrating a configuration of the present exemplary embodiment. The image generation apparatus 100 according to the present exemplary embodiment includes a position determination unit 207, which stores processing for determining the position of 3D data acquired by the 3D data acquisition unit 202. The processing unit 201 executes this processing to determine the position of each piece of 3D data at the time of combining the 3D data.

The image generation apparatus 100 includes a 3D data combining unit 206, and the processing unit 201 combines 3D data based on combining position information determined by the position determination unit 207 described above.

Figure 18:
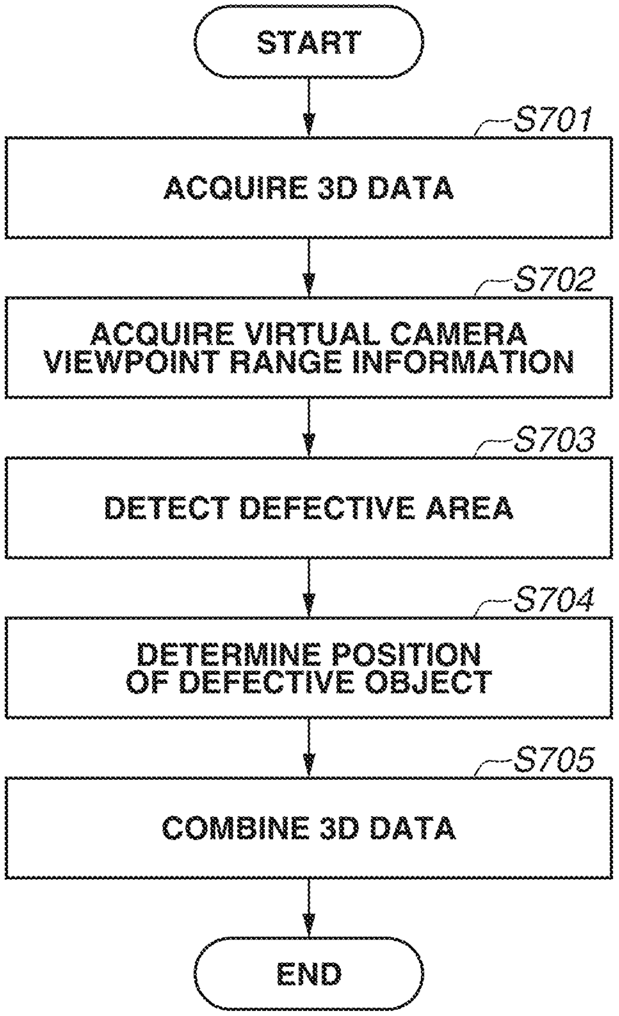
FIG. 18 is a flowchart illustrating generation processing executed by the image generation apparatus according to the second exemplary embodiment.
Figure 19A:
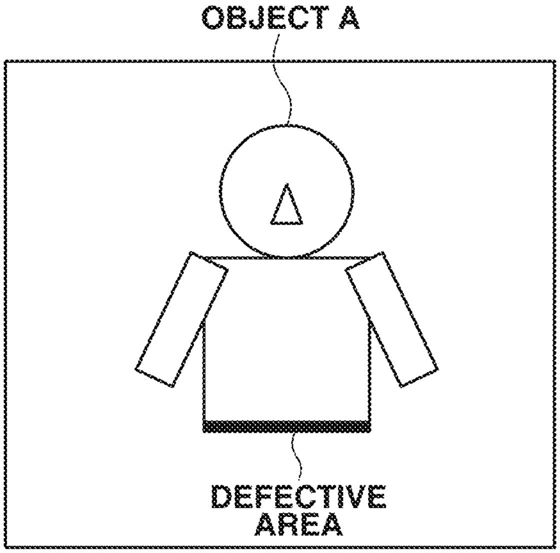
FIGS. 19A and 19B are diagrams illustrating an example of 3D data having a defective part and 3D data to be combined with the 3D data according to the second exemplary embodiment.
Figure 19B:
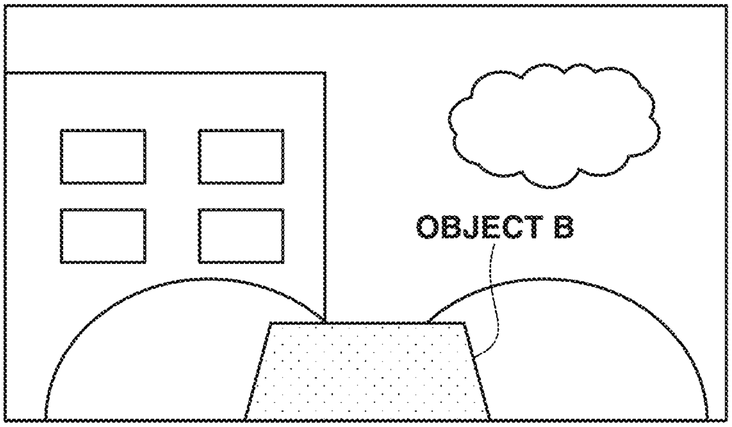

FIG. 18 is a flowchart illustrating the processing of the present exemplary embodiment. In step S701, the user inputs a plurality of pieces of 3D data to be combined. The 3D data includes 3D data containing defective object data of an object A illustrated in FIG. 19A and 3D data containing object data of an object B and background data illustrated in FIG. 19B, for example.

When the plurality of pieces of 3D data is input, in steps S702 and S703, the processing unit 201 acquires the movable range of the virtual camera and detects the defective area. These operations in the present exemplary embodiment are similar to those in the first exemplary embodiment, and thus description thereof will be omitted.

Next, in step S704, the processing unit 201 determines the position of the object A having the defective area.

First, the processing unit 201 calculates a hidden area that is hidden by the object B from coordinates of each virtual camera.

Figure 20:
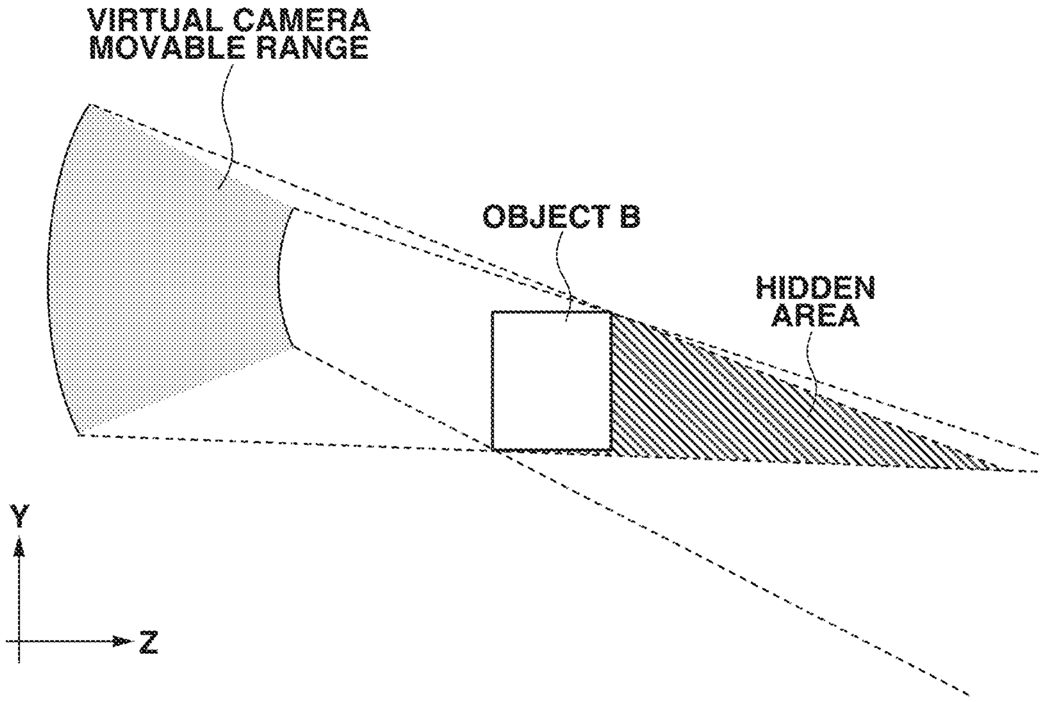
FIG. 20 is a diagram illustrating a hidden area according to the second exemplary embodiment.

FIG. 20 is a diagram illustrating the movable range of the virtual camera, the object B, and the hidden area as viewed from an x-axis direction of the world coordinate system. In this way, the hidden area is set as an area that constitutes a blind area as viewed from any virtual camera.

After the calculation of the hidden area, the processing unit 201 determines the position of the object A. First, the processing unit 201 determines the orientation of the object A. For example, if the object A is a person, the orientation of the object is set to a frontal orientation relative to the virtual camera based on the model estimated in step S703. Alternatively, if the object A is imaged by an imaging camera, the optical axis direction of the imaging camera may be set. Alternatively, a user interface (UI) operation unit that allows the user to input the orientation may be provided, and the user may input the orientation through the UI operation unit.

Next, the processing unit 201 arranges the object A so that the defective area is in the hidden area in the orientation determined as above. At this time, the processing unit 201 calculates the volume of the hidden area except for the defective area so that the non-defective area is located in the hidden area as less as possible, and determines a position where the non-defective area is the smallest.

Figure 21:
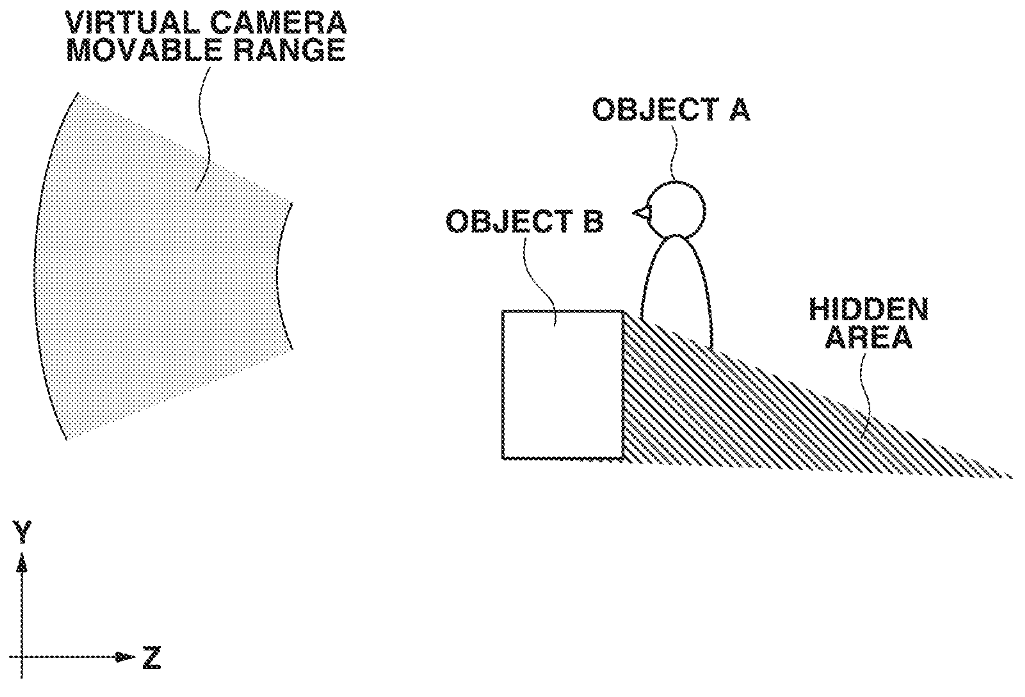
FIG. 21 is a diagram illustrating the positional relationship between the 3D data and a virtual camera according to the second exemplary embodiment.

After determining the arrangement position in this manner, the processing unit 201 executes processing stored in the 3D data combining unit 206 to combine the 3D data. FIG. 21 is a diagram illustrating the positional relationship between the object data of the object A and the object data of the object B combined by the above-described processing and the virtual camera.

Figure 22:
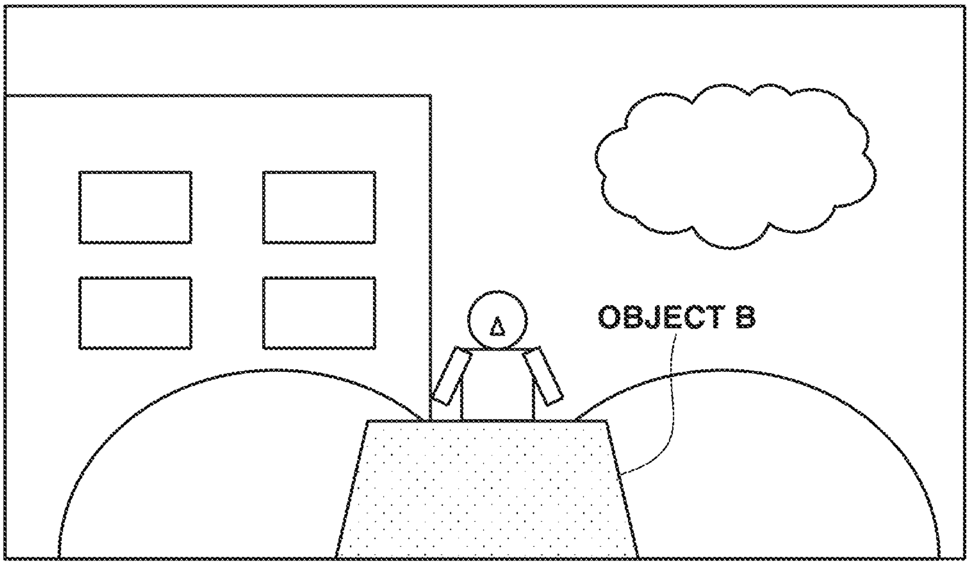
FIG. 22 is a diagram for describing an effect according to the second exemplary embodiment.

FIG. 22 is a view of 3D data obtained by combining the 3D data through the processing according to the present exemplary embodiment as viewed from a certain virtual camera position. In this manner, when the image generation apparatus 100 according to the present disclosure is used, even if the user combines 3D data having a defective area with other 3D data, the defective area is arranged in a hidden area of the 3D data, so that it is possible to combine the 3D data without a feeling of strangeness due to the defective area.

Although the desirable exemplary embodiments of the present disclosure have been described above, the present disclosure is not limited to these exemplary embodiments, and various modifications and changes are possible within the scope of the gist of the present disclosure.

According to the present disclosure, since 3D mask data can be appropriately generated for a defective area of 3D data, it is possible to provide 3D data with a few feelings of strangeness.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-175023, filed Oct. 10, 2023, which is hereby incorporated by reference herein in its entirety.

What is claimed is:

1. An image generation apparatus comprising:
one or more memories storing instructions; and
one or more processors that, upon execution of the stored instructions, are configured to operate as:
a first acquisition unit configured to acquire 3D data and a defective area of the 3D data;
a second acquisition unit configured to acquire a movable range of a virtual camera; and
a generation unit configured to
generate mask data based on the movable range of the virtual camera and the defective area such that the defective area is not visible in the movable range of the virtual camera,
determine a generation plane on which the mask data is to be generated based on a distance distribution of the 3D data with respect to a frontal direction of the virtual camera, and
determine an intersection point area from an outer peripheral surface of the movable range of the virtual camera, the defective area of the 3D data, and the generation plane, and generates the mask data in a space between the virtual camera and the defective area.

2. The image generation apparatus according to claim 1, wherein execution of the stored instructions further configures the one or more processors to operate as:
an object detection unit configured to detect a type of the object data; and
a third acquisition unit configured to acquire a representative model of a subject of the type of object data detected by the object detection unit,
wherein the 3D data includes background data that represents a background in a three-dimensional space and the object data that represents the subject, and
wherein the first acquisition unit acquires the defective area of the 3D data by comparing the acquired representative model with the object data.

3. The image generation apparatus according to claim 2, wherein the first acquisition unit is configured to estimate a shape of the 3D data from a model shape of the representative model acquired by the third acquisition unit and the 3D data, and
wherein the first acquisition unit determines the defective area by comparing an overall shape estimated by the estimation unit with the object data.

4. The image generation apparatus according to claim 1, further comprising an input unit through which a user inputs the defective area,
wherein the first acquisition unit acquires the defective area input by the input unit.

5. The image generation apparatus according to claim 1, wherein the 3D data is 3D moving image data including a plurality of consecutive pieces of still image 3D data.

6. The image generation apparatus according to claim 1,
wherein the generation unit determines a generation plane on which the mask data is to be generated based on a distance distribution of the 3D data with respect to a frontal direction of the virtual camera,
wherein the generation unit determines a search range in the movable range of the virtual camera based on position information of the defective area of the 3D data and the movable range of the virtual camera,
wherein the generation unit calculates an intersection point area from the search range, the defective area of the 3D data, and the generation plane, and
wherein the generation unit generates the mask data in a space between the virtual camera and the defective area.

7. A control method for an image generation apparatus, comprising:
acquiring 3D data and a defective area of the 3D data;
acquiring a movable range of a virtual camera; and
generating mask data based on the movable range of the virtual camera and the defective area such that the defective area is not visible in the movable range of the virtual camera;
determining a generation plane on which the mask data is to be generated based on a distance distribution of the 3D data with respect to a frontal direction of the virtual camera; and
determining an intersection point area from an outer peripheral surface of the movable range of the virtual camera, the defective area of the 3D data, and the generation plane, and generates the mask data in a space between the virtual camera and the defective area.

8. An image generation apparatus comprising:
one or more memories storing instructions; and
one or more processors that, upon execution of the stored instructions, are configured to operate as:
a first acquisition unit configured to acquire 3D data and a defective area of the 3D data;
a second acquisition unit configured to acquire a movable range of a virtual camera; and
a generation unit configured to
generate mask data based on the movable range of the virtual camera and the defective area such that the defective area is not visible in the movable range of the virtual camera
determines a generation plane on which the mask data is to be generated based on a distance distribution of the 3D data with respect to a frontal direction of the virtual camera,
determines a search range in the movable range of the virtual camera based on position information of the defective area of the 3D data and the movable range of the virtual camera,
calculates an intersection point area from the search range, the defective area of the 3D data, and the generation plane, and
generates the mask data in a space between the virtual camera and the defective area.

* * * * *